United States Patent
Lo et al.

(10) Patent No.: US 7,865,217 B2
(45) Date of Patent: Jan. 4, 2011

(54) ELECTRONIC DEVICE FOR REDUCING AUDIO NOISE CAUSED FROM UNBALANCED GROUND AND MOBILE COMMUNICATION DEVICE THEREOF

(75) Inventors: Wen-Chieh Lo, Taipei Hsien (TW); Jiun-Shiung He, Taipei Hsien (TW); Ming-Zhu Lo, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 744 days.

(21) Appl. No.: 11/843,657

(22) Filed: Aug. 23, 2007

(65) Prior Publication Data
US 2008/0318641 A1   Dec. 25, 2008

(30) Foreign Application Priority Data
Jun. 22, 2007   (TW) ............................ 96122632 A

(51) Int. Cl.
*H04M 1/00*   (2006.01)
(52) U.S. Cl. .................. 455/570; 455/114.2; 455/222; 455/278.1; 455/283; 455/296
(58) Field of Classification Search ................. 455/570, 455/114.2, 222, 278.1, 283, 296
See application file for complete search history.

(56) References Cited

U.S. PATENT DOCUMENTS 6,684,065 B2 *   1/2004   Bult et al. ................ 455/252.1

* cited by examiner

*Primary Examiner*—Nghi H Ly
(74) *Attorney, Agent, or Firm*—Winston Hsu; Scott Margo

(57) ABSTRACT

An electronic device includes a first circuit board having a first audio source and a first reference grounding end, a second circuit board having a second audio source and a second reference grounding end, a flexible board cable, a grounding wiring, a selection unit, and a receiver. The flexible board cable couples the first audio source to the second circuit board. The grounding wiring couples the first grounding end to the second circuit board. The selection unit is used for selecting one from the first and second audio sources to output and selecting one from the first and second reference grounding ends to output. An input end of the receiver is controlled by the selection unit to be connected to the first or second audio sources, and a grounding end of the receiver is controlled by the selection unit to be connected to the first or second reference grounding ends.

13 Claims, 6 Drawing Sheets

ELECTRONIC DEVICE FOR REDUCING AUDIO NOISE CAUSED FROM UNBALANCED GROUND AND MOBILE COMMUNICATION DEVICE THEREOF

BACKGROUND OF THE INVENTION

1. Field of the Invention

The present invention relates to an electronic apparatus for reducing audio noise caused from unbalanced ground and mobile communication device thereof, and more particularly, to an electronic apparatus for reducing audio noise by connecting the grounding end of one circuit board of the electronic apparatus to another circuit board through a grounding wiring and by selecting the output grounding end through a selection unit.

2. Description of the Prior Art

Mobile communication is an extremely popular industry field in recent years, and all kinds of wireless communication technologies move forward constantly. Take mobile phone systems as example, e.g. global system for mobile communication (GSM), personal handy-phone system (PHS), code division multiple access (CDMA) system, wideband CDMA system, or wireless fidelity (Wi-Fi) system, which are several widely-use mobile phone systems currently.

Please refer to FIG. 1. FIG. 1 is a diagram of an electronic apparatus 10 according to the prior art. The electronic apparatus 10 is a dual mode mobile, which supports dual SIM cards. In times of the packed mobile phone stress, it is indeed a big challenge to dispose two systems within a normal size folding mobile phone. In order to reduce the size of the mobile phone, we will respectively dispose these two systems on a first circuit board 110 and on a second circuit board 120 and utilize a flexible board cable 130 to connect the first circuit board 110 and the second circuit board 120 as well as retrench pin numbers of the flexible board cable 130. In such circumstances, the pin numbers of the grounding will be minimized, which will result in unbalanced ground on both sides of the first circuit board 110 and the second circuit board 120. That is to say the reference grounding end of the first circuit board 110 is different from that of the second circuit board 120. Assume that an earphone jack 140 is disposed on the second circuit board 120, and a user inserts a receiver 150 into the earphone jack 140 to answer an incoming call through the receiver 150. In this embodiment, the receiver 150 is an earphone, which adopts a single-end audio input as its audio source and takes the reference grounding end of the second circuit board 120 as its reference point. When the user adopts the system disposed on the second circuit board 120 to use the receiver 150, therefore, the user won't hear current noises due to both the earphone jack 140 and the second circuit board 120 utilizing the same reference grounding end as their reference points. If the user adopts the system disposed on the first circuit board 110 to use the receiver 150, the user will hear a great current noise due to the reference grounding end of the earphone jack 140 being different from that of the first circuit board 110 and there being an unbalanced ground on two sides.

Please refer to FIG. 2. FIG. 2 is a diagram of sound intensity and frequency distribution of the electronic apparatus 10 in FIG. 1. Here, the electronic apparatus 10 adopts the system disposed on the first circuit board 110 (a first mode, i.e. GSM system) to use the receiver 150. As shown in FIG. 2, it can see that the sound intensity of the noises is roughly 61.4 dB at the frequency 218 Hz, the sound intensity of the noises is about 53.0 dB at the frequency 431 Hz, the sound intensity of the noises is about 46.8 dB at the frequency 650 Hz, and so on. At this time, because the reference grounding end of the receiver 150 is the grounding end of the system disposed on the second circuit board 120 (a second mode, i.e. PHS system) and the first circuit board 110 utilizes its grounding end of the GSM system as the reference point, thus the utilized reference points on two sides are different. Therefore, the user will hear a great current noise (the sound intensity of the noises falls in 45-61 dB).

Since the connectors of the flexible board cable usually have some slight DC impedance, where these slight DC impedance will cause in inconsistency between the reference grounding end of the first circuit board 110 and that of the second circuit board 120. Generally speaking, the receiver 150 adopts a single-end audio input as its audio source and takes the reference grounding end of the second circuit board 120 as its reference point. When the user adopts the system disposed on the second circuit board 120 to use the receiver 150, therefore, the user won't hear the current noises due to both the earphone jack 140 and the second circuit board 120 utilizing the same reference grounding end as their reference points. When the user adopts the system disposed on the first circuit board 110 to use the receiver 150, the user will hear a great current noise due to the reference grounding end of the earphone jack 140 being different from that of the first circuit board 110 and there being an unbalanced ground on two sides. This situation will cause a great distress to the user, and worse still, the hearing of the user will be impaired easily.

SUMMARY OF THE INVENTION

The claimed invention provides an electronic apparatus for reducing audio noise caused from unbalanced ground. The electronic apparatus includes a first circuit board, a second circuit board, a flexible board cable, a grounding wiring, a selection unit, and a receiver. The first circuit board includes a first audio source utilized for providing a first mode audio input, and a first reference grounding end utilized as a reference ground of the first circuit board. The second circuit board includes a second audio source utilized for providing a second mode audio input, and a second reference grounding end utilized as a reference ground of the second circuit board. The flexible board cable is utilized for coupling the first audio source of the first circuit board to the second circuit board, and the grounding wiring is utilized for coupling the first reference grounding end of the first circuit board to the second circuit board. The selection unit, disposed on the second circuit, has a first input end, a second input end, a third input end, a fourth input end, a first output end, and a second output end, whereof the first input end, the second input end, the third input end, and the fourth input end are respectively utilized for receiving the first audio source, the second audio source, the first reference grounding end, and the second reference grounding end. The selection unit selects one from the first audio source and the second audio source to output and selects one from the first reference grounding end and the second reference grounding end to output. The receiver is disposed on the second circuit board and has an input end and a grounding end, whereof the input end is coupled to the first output end of the selection unit and controlled by the selection unit to be coupled to the first audio source or to the second audio source, and the grounding end is coupled to the second output end of the selection unit and controlled by the selection unit to be coupled to the first reference grounding end or to the second reference grounding end. When the first mode audio input is inputted, the selection unit selects to output the first audio source to the first output end and to be coupled to the input end of the receiver, and selects to output the first reference grounding end to the second output end and to be coupled to the grounding end of the receiver. When the second mode audio input is inputted, the selection unit selects to output the second audio source to the first output end and to be coupled to the input end of the receiver, and selects to output the second reference grounding end to the second output end and to be coupled to the grounding end of the receiver.

In one embodiment, the electronic apparatus is a multi-mode mobile.

In one embodiment, the first mode and the second mode are each a global system for mobile communication (GSM), a personal handy-phone system (PHS), a code division multiple access (CDMA) system, a wideband CDMA system, or a wireless fidelity (Wi-Fi) system.

In one embodiment, the selection unit includes at least one switch.

In one embodiment, the selection unit is a multiplexer.

In one embodiment, the receiver is an earphone.

The claimed invention provides a mobile communication apparatus for connecting a single-end input earphone. The mobile communication apparatus includes a first circuit board, a second circuit board, and a selection unit. The first circuit board has a first audio source and a first reference grounding end. The second circuit board has a second audio source and a second reference grounding end. The selection unit is utilized for selecting to be coupled to the first audio source and to the first reference grounding end, or selecting to be coupled to the second audio source and to the second reference grounding end.

In one embodiment, the selection unit is an analog switch.

The claimed invention provides a mobile communication apparatus. The mobile communication apparatus includes a first analog switch, a second analog switch, and a receiver. The first analog switch is coupled to a second audio source and coupled to a first audio source through a flexible board cable, where the first analog switch is capable of selecting to be coupled to the first audio source or to the second audio source. The second analog switch is coupled to a second reference grounding end and coupled to a first reference grounding end through a grounding wiring, where the second analog switch is capable of selecting to be coupled to the first reference grounding end or to the second reference grounding end. The receiver has an input end and a grounding end, whereof the input end is coupled to an output end of the first analog switch and controlled by the first analog switch to be coupled to the first audio source or to the second audio source, and the grounding end is coupled to an output end of the second analog switch and controlled by the second analog switch to be coupled to the first reference grounding end or to the second reference grounding end.

In one embodiment, the receiver is a single-end audio input device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
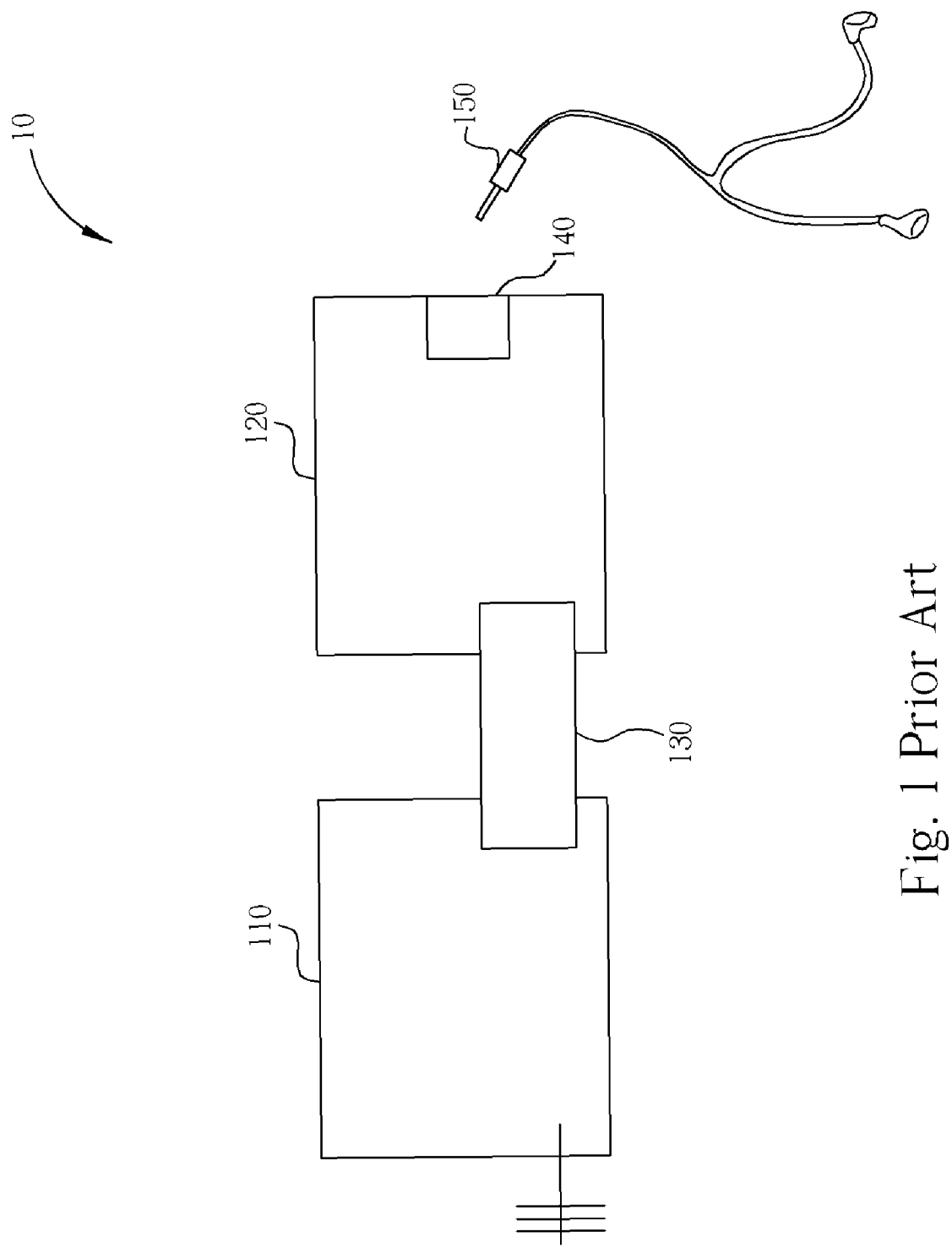
FIG. 1 is a diagram of a conventional electronic apparatus.
Figure 2:
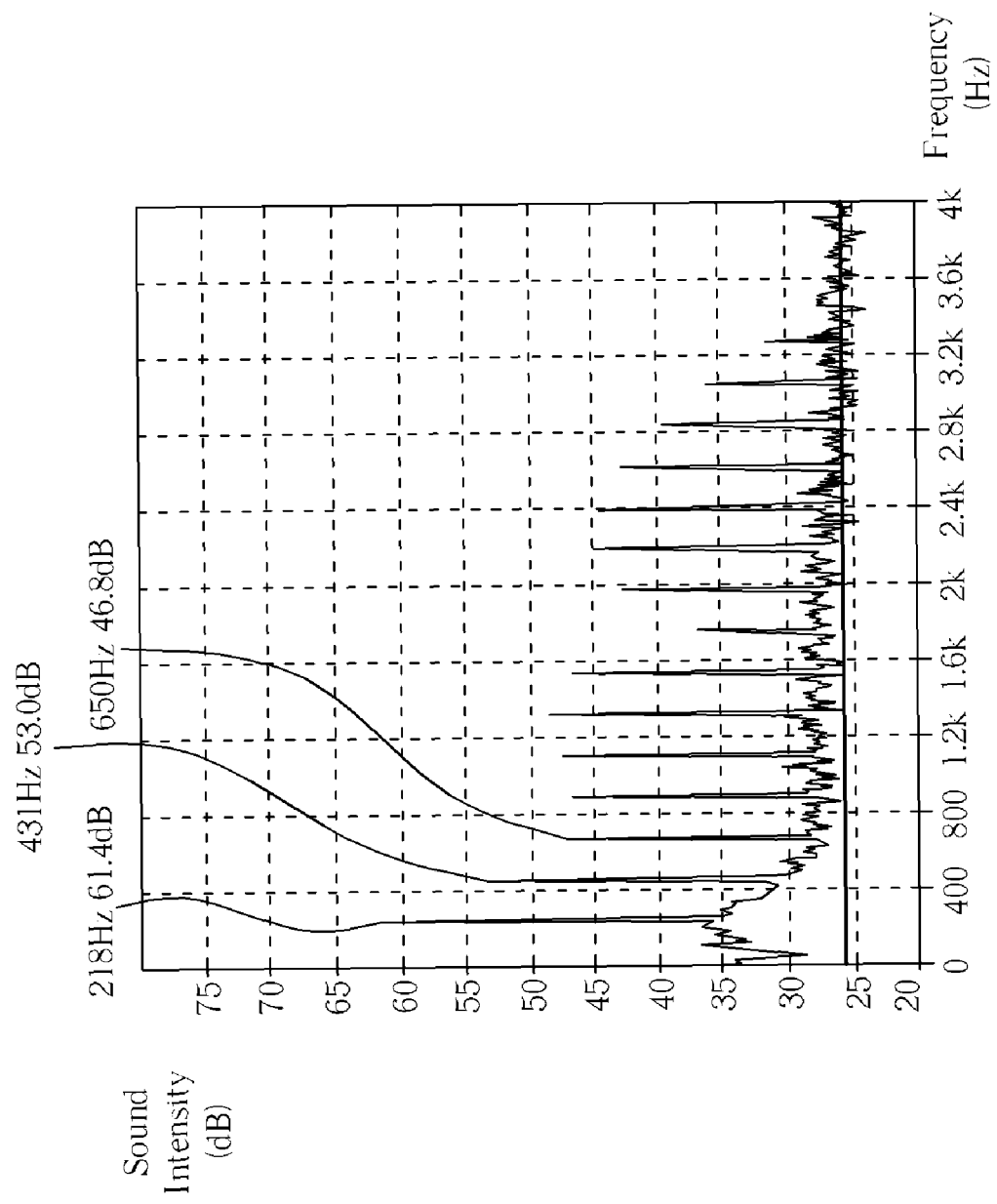
FIG. 2 is a diagram of sound intensity and frequency distribution of the electronic apparatus in FIG. 1.
Figure 3:
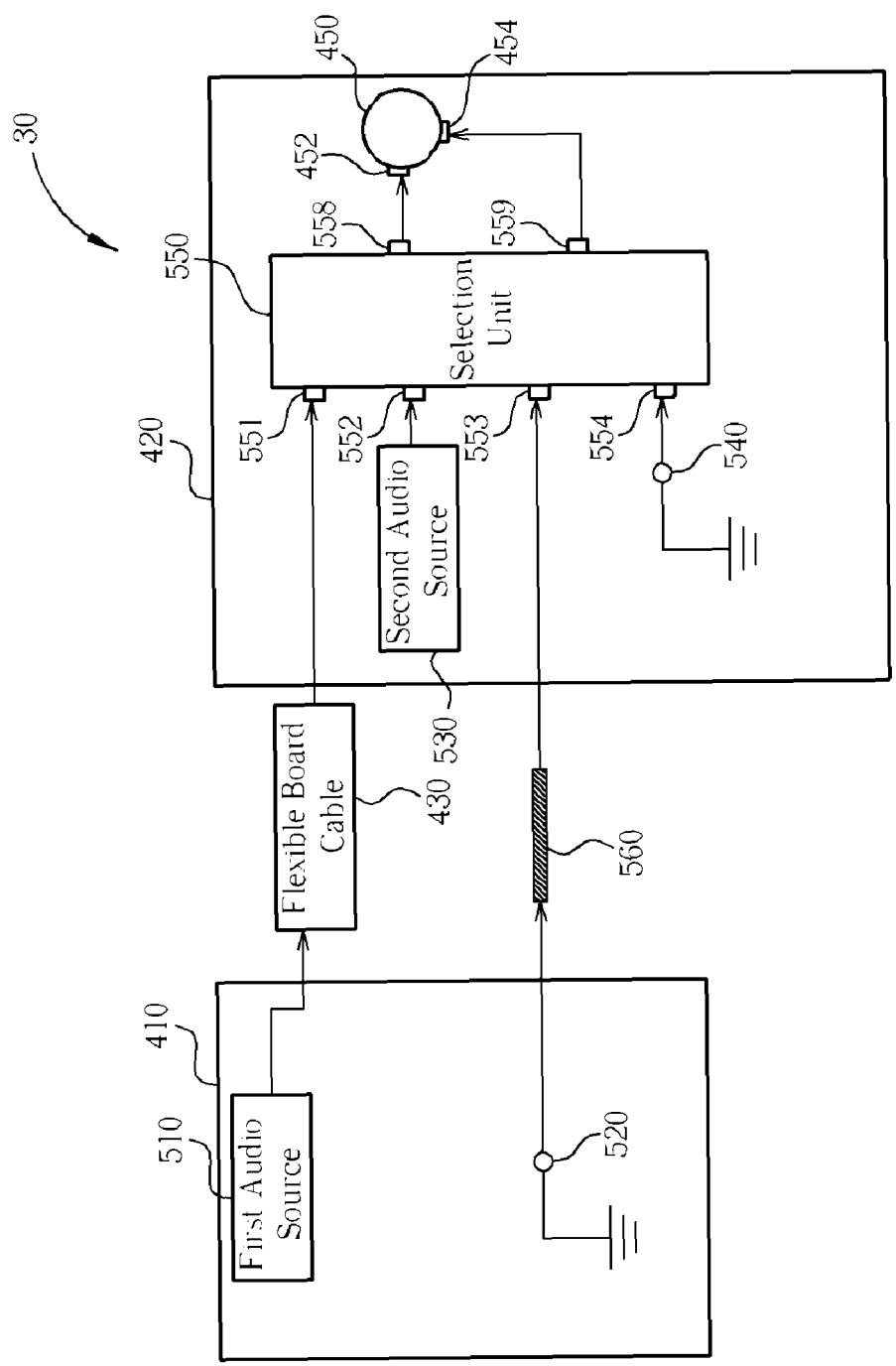
FIG. 3 is a block diagram of an electronic apparatus for reducing audio noise caused from unbalanced ground according to a first embodiment of the present invention.

Please refer to FIG. 3. FIG. 3 is a block diagram of an electronic apparatus 30 for reducing audio noise caused from unbalanced ground according to a first embodiment of the present invention. The electronic apparatus 30 is a dual mode mobile, which supports dual SIM cards. The electronic apparatus 30 includes a first circuit board 410, a second circuit board 420, a flexible board cable 430, a grounding wiring 560, a selection unit 550, and a receiver 450. The first circuit board 410 includes a first audio source 510 and a first reference grounding end 520, where the first audio source 510 is used for providing a first mode audio input, and the first reference grounding end 520 is used as the reference ground of the first circuit board 410. For example, the first mode audio input is a global system for mobile communication (GSM). The second circuit board 420 includes a second audio source 530 and a second reference grounding end 540. The second audio source 530 is used for providing a second mode audio input, and the second reference grounding end 540 is used as a reference ground of the second circuit board 420. For example, the second mode audio input is a personal handy-phone system (PHS). The flexible board cable 430 is used for coupling the first audio source 510 of the first circuit board 410 to the second circuit board 420, and the grounding wiring 560 is used for coupling the first reference grounding end 520 of the first circuit board 420 to the second circuit board 420, where the grounding wiring 560 couples the first reference grounding end 520 of the first circuit board 410 to the second circuit board 420 through a welding.

Please keep referring to FIG. 3. The selection unit 550 is disposed on the second circuit board 420, which includes a first input end 551, a second input end 552, a third input end 553, a fourth input end 554, a first output end 558, and a second output end 559. The first input end 551 is coupled to the flexible board cable 430 for receiving the audio input of the first audio source 510 (the first mode, i.e. GSM system). The second input end 552 is coupled to the second audio source 530 for receiving the audio input of the second audio source 530 (the second mode, i.e. PHS system). The third input end 553 is coupled to the grounding wiring 560, and through the grounding wiring 560, is indirectly coupled to the first reference grounding end 520. The fourth input end 554 is coupled to the second reference grounding end 540. The selection unit 550 selects one from the first audio source 510 and the second audio source 530 to transmit to the first output end 558 according to a control signal, and selects one from the first grounding end 520 and the second grounding end 540 to transmit to the second output end 559 according to the control signal. The receiver 450 is disposed on the second circuit board 420, which includes an input end 452 and a grounding end 454. The input end 452 of the receiver 450 is coupled to the first output end 558 of the selection unit 550 and is controlled by the selection unit 550 to be coupled to the first audio source 510 or to the second audio source 530, and the grounding end 454 of the receiver 450 is coupled to the second output end 559 of the selection unit 550 and is controlled by the selection unit 550 to be coupled to the first reference grounding end 520 or to the second reference grounding end 540.

In the following, the operations of the electronic apparatus 30 are further explained in detail. When the user adopts the system disposed on the second circuit board 420 (the second mode, i.e. PHS system) to use the receiver 450, the selection unit 550 selects to output the second audio source 530 received at the second input end 552 and transmits it to the input end 452 of the receiver 450, and selects to output the second reference grounding end 540 received at the fourth input end 554 and transmits it to the grounding end 454 of the receiver 450. Because both the receiver 450 and the second audio source 530 utilize the second reference grounding end 540 as the reference point, the user won't hear the current noise. If the user adopts the system disposed on the first circuit board 410 (the first mode, i.e. GSM system) to use the receiver 450, the selection unit 550 selects to output the first audio source 510 received at the first input end 551 and transmits it to the input end 452 of the receiver 450, and selects to output the first reference grounding end 520 received at the third input end 553 and transmits it to the grounding end 454 of the receiver 450. Due to both the receiver 450 and the first audio source 510 using the first reference grounding end 520 as their reference points, the user still won't hear the current noise, therefore, the prior art problems can be solved.

Please note that, the electronic apparatus 30 can be a mobile communication apparatus, e.g. a PDA mobile, a GPS mobile, or a multimode mobile, but is not limited to them only. The abovementioned embodiments are merely used for describing the present invention, where the first mode and the second mode includes, but not limited to, GSM system, PHS system, CDMA system, WCDMA system, Wi-Fi system, or any kind of other wireless communication systems.

Please note that again, the abovementioned selection unit 550 can include, but not limited to, at least one switch or a multiplexer, or selection devices in other types can be adopted. In addition, the number of the selection unit 550 is not limited to one only. In other embodiment, one select unit can be used for selecting to be coupled to the first audio source 510 or the second audio source 530 while another select unit can be used for selecting to be coupled to the first reference grounding end 520 or the second reference grounding end 540. It is noteworthy that in a preferred embodiment, the selection unit 550 must be a low impedance switch, e.g. an analog switch. Furthermore, the receiver 450 is a single-end audio input device, such as an earphone. The control signal above, for controlling the selection unit 550, can be generated through software, but is not limited to this only and other manners can be adopted.

Figure 4:
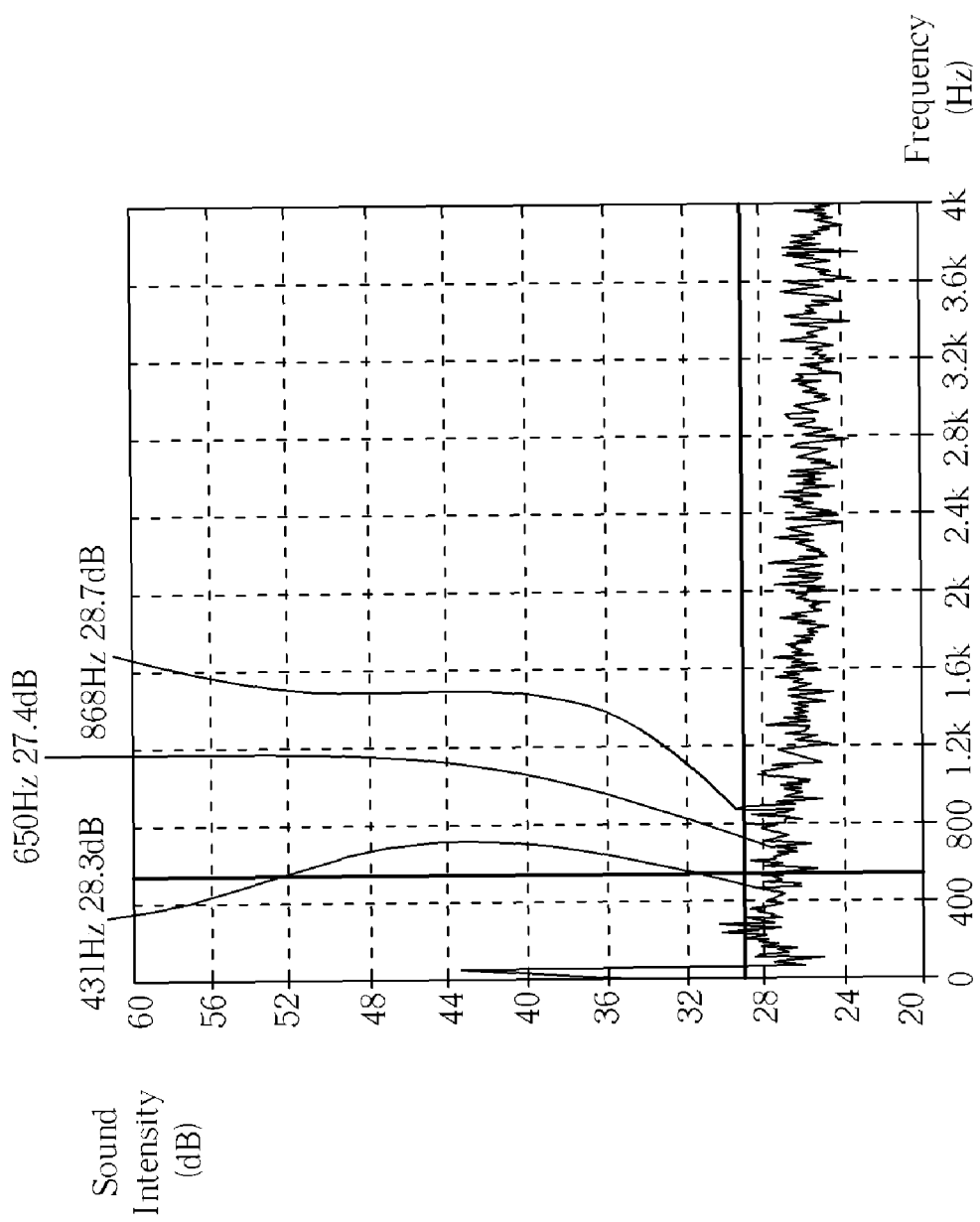
FIG. 4 is a diagram of sound intensity and frequency distribution of the electronic apparatus in FIG. 3.

Please refer to FIG. 4. FIG. 4 is a diagram of sound intensity and frequency distribution of the electronic apparatus 30 in FIG. 3. Here, the electronic apparatus 30 adopts the system disposed on the first circuit board 410 (the first mode, i.e. GSM system) to use the receiver 450. As shown in FIG. 4, it can see that the sound intensity of the noises is about 28.3 dB at the frequency 431 Hz, the sound intensity of the noises is about 27.4 dB at the frequency 650 Hz, the sound intensity of the noises is about 28.7 dB at the frequency 868 Hz, and so on. At this time, the selection unit 550 selects to output the first audio source 510 received at the first output end 551 and transmits it to the input end 452 of the receiver 450, and selects to output the first reference grounding end 520 received at the third input end 553 and transmits it to the grounding end 454 of the receiver 450. Because both the receiver 450 and the first audio source 510 of the first circuit board 410 utilize the first reference grounding end 520 as the reference point, the user won't hear the current noise (the sound intensity of the noises falls in 27-30 dB).

Be noted that, the audible range of human ears is commonly quoted as from 20 Hz to 20 KHz, which is called "hearing range". However, the loudness is based on human ears' perception to the sound intensity, which usually takes decibel (dB) as a unit for measuring the sound intensity. 0 dB is set as the threshold of hearing of human ears, that is to say the smallest sound pressure that human ears can feel the existence of sound. However, everyone's threshold of hearing varies significantly. In general, human ears are unnoticeable to the sound below 32 dB.

Figure 5:
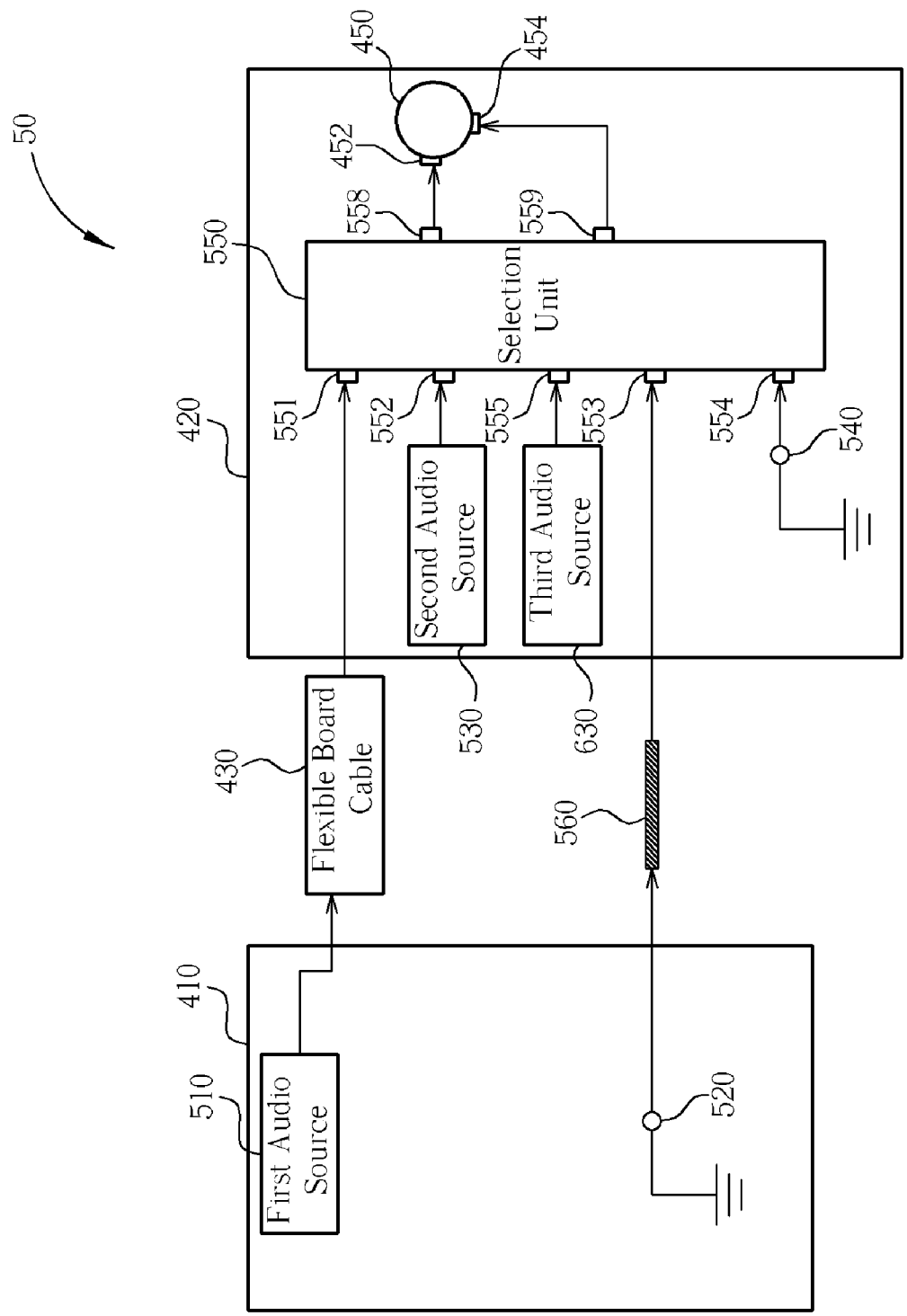
FIG. 5 is a block diagram of an electronic apparatus for reducing audio noise caused from unbalanced ground according to a second embodiment of the present invention.

Please refer to FIG. 5. FIG. 5 is a block diagram of an electronic apparatus 50 for reducing audio noise caused from unbalanced ground according to a second embodiment of the present invention. The framework of the electronic apparatus 50 is similar to that of the electronic apparatus 30, which is a varied embodiment of the electronic apparatus 30. Please note that, the difference between them is that the electronic apparatus 50 further includes a third audio source 630, disposed on the second circuit board 420, for providing a third mode audio input. For example, the third mode audio input is a wireless fidelity (Wi-Fi) system. The selection unit 550 further includes a fifth input end 555 coupled to the third audio source 630 for receiving the audio input from the third audio source 630 (the third mode, i.e. Wi-Fi system). At this time, the selection unit 550 selects one from the first audio source 510, the second audio source 530, and the third audio source 630 to transmit to the first output end 558 according to the control signal, and selects one from the first grounding end 520 and the second reference grounding end 540 to transmit to the second output end 559 according to the control signal. The input end 452 of the receiver 450 is coupled to the first output end 558 of the selection unit 550 and is controlled by the selection unit 550 to be coupled to the first audio source 510, the second audio source 530, or the third audio source 630. The grounding end 454 of the receiver 450 is coupled to the second output end 559 of the selection unit 550 and is controlled by the selection unit 550 to be coupled to the first reference grounding end 520 or the second reference grounding end 540.

In the following, the operations of the electronic apparatus 50 are explained in greater detail. When the user adopts the first mode (GSM system) disposed on the first circuit board 410 to use the receiver 450, the selection unit 550 selects to output the first audio source 510 received at the first input end 551 and transmits it to the input end 452 of the receiver 450, and selects to output the first reference grounding end 520 received at the third input end 553 and transmits it to the grounding end 454 of the receiver 450. Because both the receiver 450 and the first audio source 510 use the first reference grounding end 520 as their reference points, the user won't hear the current noise. When the user adopts the second mode (i.e. PHS system) disposed on the second circuit board 420 to use the receiver 450, the selection unit 550 selects to output the second audio source 530 received at the second input end 552 and transmits it to the input end 452 of the receiver 450, and selects to output the second reference grounding end 540 received at the fourth input end 554 and transmits it to the grounding end 454 of the receiver 450. Due to both the receiver 450 and the second audio source 530 utilizing the second reference grounding end 540 as their reference points, the user won't hear the current noise. If the user adopts the third mode (i.e. Wi-Fi system) disposed on the second circuit board 420 to use the receiver 450, the selection unit 550 selects to output the third audio source 630 received at the fifth input end 555 and transmits it to the input end 452 of the receiver 450, and selects to output the second reference grounding end 540 received at the third input end 553 and transmits it to the grounding end 454 of the receiver 450. Because both the receiver 450 and the third audio source 630 use the second reference grounding end 540 as their reference points, the user still won't hear the current noises. No current noises will be heard no matter what system is adopted by the user to answer the incoming calls, therefore, the prior art problems are completely resolved.

Figure 6:
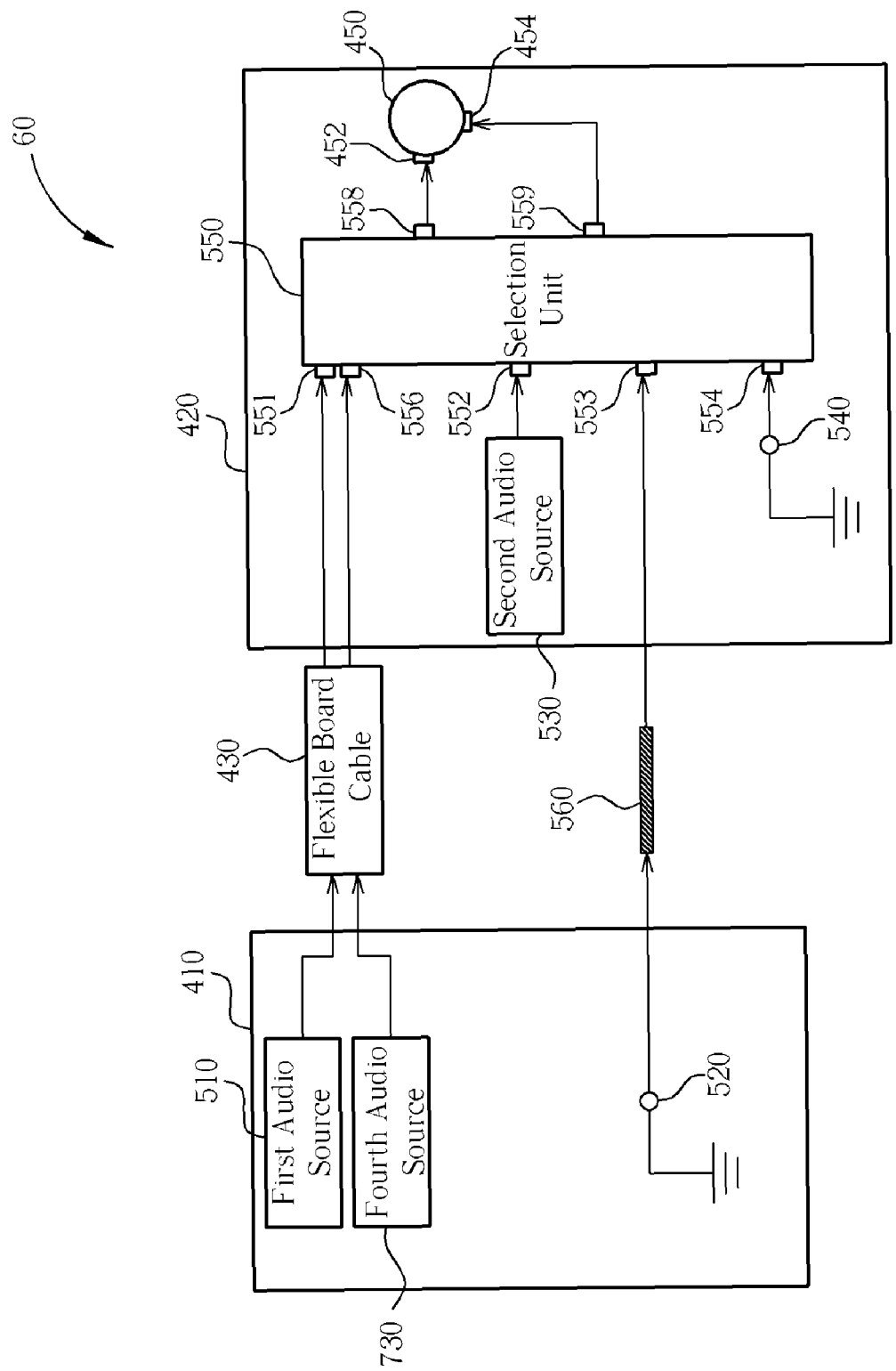
FIG. 6 is a block diagram of an electronic apparatus for reducing audio noise caused from unbalanced ground according to a third embodiment of the present invention.

Please refer to FIG. 6. FIG. 6 is a block diagram of an electronic apparatus 60 for reducing audio noise caused from unbalanced ground according to a third embodiment of the present invention. The framework of the electronic apparatus 60 is similar to that of the electronic apparatus 30, which is a varied embodiment of the electronic apparatus 30. Please note that, the difference between them is that the electronic apparatus 60 further includes a fourth audio source 730, disposed on the first circuit board 410, for providing a fourth mode audio input. For example, the fourth mode audio input is a code division multiple access (CDMA) system. The flexible board cable is further used for coupling the fourth audio source 730 disposed on the first circuit board 410 to the second circuit board 420. The selection unit 550 further includes a sixth input end 556 coupled to the flexible board cable 430 for receiving the audio input from the fourth audio source 730 (the fourth mode, i.e. CDMA system). At this time, the selection unit 550 selects one from the first audio source 510, the second audio source 530, and the fourth audio source 730 to transmit to the first output end 558 according to the control signal, and selects one from the first grounding end 520 and the second grounding end 540 to transmit to the second output end 559 according to the control signal. The input end 452 of the receiver 450 is coupled to the first output end 558 of the selection unit 550 and is controlled by the selection unit 550 to be coupled to the first audio source 510, the second audio source 530, or the fourth audio source 730. The grounding end 454 of the receiver 450 is coupled to the second output end 559 of the selection unit 550 and is controlled by the selection unit 550 to be coupled to the first reference grounding end 520 or the second reference grounding end 540.

In the following, the operations of the electronic apparatus 60 are explained in greater detail. When the user adopts the first mode (GSM system) disposed on the first circuit board 410 to use the receiver 450, the selection unit 550 selects to output the first audio source 510 received at the first input end 551 and transmits it to the input end 452 of the receiver 450, and selects to output the first reference grounding end 520 received at the third input end 553 and transmits it to the grounding end 454 of the receiver 450. Because both the receiver 450 and the first audio source 510 use the first reference grounding end 520 as their reference points, the user won't hear the current noise. If the user adopts the fourth mode (i.e. CDMA system) disposed on the first circuit board 410 to use the receiver 450, the selection unit 550 selects to output the fourth audio source 730 received at the sixth input end 556 and transmits it to the input end 452 of the receiver 450, and selects to output the first reference grounding end 520 received at the third input end 553 and transmits it to the grounding end 454 of the receiver 450. Because both the receiver 450 and the fourth audio source 730 use the first reference grounding end 520 as their reference points, the user still won't hear the current noises. When the user adopts the second mode (i.e. PHS system) disposed on the second circuit board 420 to use the receiver 450, the selection unit 550 selects to output the second audio source 530 received at the second input end 552 and transmits it to the input end 452 of the receiver 450, and selects to output the second reference grounding end 540 received at the fourth input end 554 and transmits it to the grounding end 454 of the receiver 450. Because both the receiver 450 and the second audio source 530 utilize the second reference grounding end 540 as their reference points, the user won't hear the current noise. No current noises will be heard no matter what system is adopted by the user to answer the incoming calls, therefore, the prior art problems are completely resolved.

Please note that, the electronic apparatus 30 can include, but not limited to the abovementioned electronic apparatuses 50 and 60 only, different variations. For example, these two varied embodiments above can be merged into another varied embodiment. It will be obvious to those skilled in the art that various modifications may be made without departing from the spirit of the present disclosure.

The abovementioned embodiments are presented merely for describing the present invention, and in no way should be considered to be limitations of the scope of the present invention. The electronic apparatus can comprise a plurality of varied embodiments, for example, the electronic apparatuses 50 and 60 increase the number of the audio inputs. The electronic apparatuses 30, 50, and 60 can be a multimode mobile, and the number of the adopted systems is not limited to two or three modes only and can be expanded to a plurality of modes. The embodiments above are merely for illustrating the present invention, where the first mode, the second mode, the third mode, and the fourth mode can include, but not limited to, a GSM system, a PHS system, a CDMA system, a wide-band CDMA system, a Wi-Fi system, or any kind of wireless communication system. Please note that, the abovementioned selection unit 550 can include, but not limited to, at least one switch or a multiplexer, and can be selection devices in other types. It is noteworthy that in a preferred embodiment, the selection unit 550 must be a low impedance switch. In addition, the control signal used for controlling the selection unit 550 can be generated, but not limited to, through software.

In summary, the present invention provides the electronic apparatuses 30, 50, and 60 for reducing audio noise caused from unbalanced ground. Through the additional grounding wiring 560, the first reference grounding end 520 disposed on the first circuit board 410 is directly connected to the second circuit board. In addition, through the selection unit 550, the first reference grounding end 520 and the second reference grounding end 540 are switched for the usage of the receiver 450. Hence, both the receiver 450 and any audio input of any system use the same grounding end as their reference points, which can substantially reduce the sound intensity of noises below 32 dB. Due to human ears being unnoticeable to sound intensity below 32 dB, the user won't hear the current noise. No current noises will be heard no manner what system is used for answering the incoming calls, therefore, the prior art problems can be completely resolved.

Those skilled in the art will readily observe that numerous modifications and alterations of the device and method may be made while retaining the teachings of the invention.

What is claimed is:

1. An electronic apparatus for reducing audio noise caused from unbalanced ground, the electronic apparatus comprising:
    a first circuit board comprising:
        a first audio source, utilized for providing a first mode audio input; and
        a first reference grounding end, utilized as a reference ground of the first circuit board;

a second circuit board comprising:
   a second audio source, utilized for providing a second mode audio input; and
   a second reference grounding end, utilized as a reference ground of the second circuit board;
a flexible board cable, utilized for coupling the first audio source of the first circuit board to the second circuit board;
a grounding wiring, utilized for coupling the first reference grounding end of the first circuit board to the second circuit board;
a selection unit, disposed on the second circuit board, having a first input end, a second input end, a third input end, a fourth input end, a first output end, and a second output end, wherein the first input end, the second input end, the third input end, and the fourth input end are respectively utilized for receiving the first audio source, the second audio source, the first reference grounding end, and the second reference grounding end, the selection unit selects one from the first audio source and the second audio source to output and selects one from the first reference grounding end and the second reference grounding end to output; and
a receiver, disposed on the second circuit board, having an input end coupled to the first output end of the selection unit and controlled by the selection unit to be coupled to the first audio source or to the second audio source, and a grounding end coupled to the second output end of the selection unit and controlled by the selection unit to be coupled to the first reference grounding end or to the second reference grounding end;
wherein when the first mode audio input is inputted, the selection unit selects to output the first audio source to the first output end and to be coupled to the input end of the receiver, and the selection unit selects to output the first reference grounding end to the second output end and to be coupled to the grounding end of the receiver;
wherein when the second mode audio input is inputted, the selection unit selects to output the second audio source to the first output end and to be coupled to the input end of the receiver, and the selection unit selects to output the second reference grounding end to the second output end and to be coupled to the grounding end of the receiver.

2. The electronic apparatus of claim 1, wherein the electronic apparatus is a multimode mobile phone.

3. The electronic apparatus of claim 1 further comprising:
a third audio source, disposed on the second circuit board, for providing a third mode audio input.

4. The electronic apparatus of claim 3, wherein the first mode, the second mode, and the third mode are each a global system for mobile communication (GSM), a personal handyphone system (PHS), a code division multiple access (CDMA) system, a wideband CDMA system, or a wireless fidelity (Wi-Fi) system.

5. The electronic apparatus of claim 3, wherein:
the selection unit further comprises a fifth input end utilized for receiving the third audio source, the selection unit selects one from the first audio source, the second audio source, and the third audio source to output to the first output end and selects one from the first grounding end and the second grounding end to output to the second output end; and
the input end of the receiver is coupled to the first output end of the selection unit and is controlled by the selection unit to be coupled to the first audio source, to the second audio source, or to the third audio source, and the grounding end of the receiver is coupled to the second output end of the selection unit and is controlled by the selection unit to be coupled to the first reference grounding end or to the second reference grounding end.

6. The electronic apparatus of claim 5, wherein:
when the first mode audio input is inputted, the selection unit selects to output the first audio source to the first output end and to be coupled to the input end of the receiver, and the selection unit selects to output the first reference grounding end to the second output end and to be coupled to the grounding end of the receiver;
when the second mode audio input is inputted, the selection unit selects to output the second audio source to the first output end and to be coupled to the input end of the receiver, and the selection unit selects to output the second reference grounding end to the second output end and to be coupled to the grounding end of the receiver; and
when the third mode audio input is inputted, the selection unit selects to output the third audio source to the first output end and to be coupled to the input end of the receiver, and the selection unit selects to output the second reference grounding end to the second output end and to be coupled to the grounding end of the receiver.

7. The electronic apparatus of claim 1 further comprising:
a fourth audio source, disposed on the first circuit board, for providing a fourth mode audio input.

8. The electronic apparatus of claim 7, wherein the first mode, the second mode, and the fourth mode are each a GSM system, a PHS system, a CDMA system, a wideband CDMA system, or a Wi-Fi system.

9. The electronic apparatus of claim 7, wherein:
the flexible board cable is further utilized for coupling the fourth audio source of the first circuit board to the second circuit board;
the selection unit further comprises a sixth input end four receiving the fourth audio source, the selection unit selects one from the first audio source, the second audio source, and the fourth audio source to output to the first output end and selects one from the first reference grounding end and the second reference grounding end to output to the second output end; and
the input end of the receiver is coupled to the first output end of the selection unit and is controlled by the selection unit to be coupled to the first audio source, to the second audio source, or to the fourth audio source, and a grounding end of the receiver is coupled to the second output end of the selection unit and is controlled by the selection unit to be coupled to the first reference grounding end or to the second reference grounding end.

10. The electronic apparatus of claim 9, wherein:
when the first mode audio input is inputted, the selection unit selects to output the first audio source to the first output end and to be coupled to the input end of the receiver, and the selection unit selects to output the first reference grounding end to the second output end and to be coupled to the grounding end of the receiver;
when the second mode audio input is inputted, the selection unit selects to output the second audio source to the first output end and to be coupled to the input end of the receiver, and the selection unit selects to output the second reference grounding end to the second output end and to be coupled to the grounding end of the receiver; and
when the fourth mode audio input is inputted, the selection unit selects to output the fourth audio source to the first output end and to be coupled to the input end of the receiver, and the selection unit selects to output the first reference grounding end to the second output end and to be coupled to the grounding end of the receiver.

11. The electronic apparatus of claim 1, wherein the grounding wiring directly couples the first reference grounding end of the first circuit board to the second circuit board through a welding.

12. The electronic apparatus of claim 1, wherein the selection unit comprises at least one switch or a multiplexer.

13. The electronic apparatus of claim 1, wherein the receiver is a single-end audio input device.

* * * * *